United States Patent
Farnsworth

(10) Patent No.: US 6,687,232 B1
(45) Date of Patent: Feb. 3, 2004

(54) SUBSCRIBER LOOP TERMINAL EQUIPMENT-RESIDENT MECHANISM FOR DETERMINING BIT RATE OF HIGH-LEVEL DATA LINK CONTROL COMMUNICATION CHANNEL

(75) Inventor: Kyle A. Farnsworth, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 0 days.

(21) Appl. No.: 09/483,349

(22) Filed: Jan. 14, 2000

(51) Int. Cl.$^7$ .............................................. H04L 12/26
(52) U.S. Cl. ........................ 370/252; 370/282; 370/467; 370/469; 709/228; 709/230
(58) Field of Search ................................. 370/252, 254, 370/255, 282, 464, 465, 466, 467, 468, 469, 470, 471; 709/227, 228, 230

(56) References Cited

U.S. PATENT DOCUMENTS

| | | | |
|---|---|---|---|
| 5,072,407 A | * 12/1991 | Gutz et al. .................. 709/246 |
| 5,231,649 A | 7/1993 | Duncanson .................. 370/84 |
| 5,361,259 A | 11/1994 | Hunt et al. .................. 370/84 |
| 5,461,618 A | 10/1995 | Chen et al. .................. 370/84 |
| 5,654,983 A | * 8/1997 | Sauser, Jr. .................. 375/225 |
| 5,796,724 A | 8/1998 | Rajamani et al. ........... 370/263 |
| 5,850,388 A | * 12/1998 | Anderson et al. ............ 370/252 |
| 5,914,945 A | 6/1999 | Abu-Amara et al. ........ 370/329 |
| 6,097,754 A | * 8/2000 | Fitch et al. .................. 375/222 |
| 6,122,287 A | * 9/2000 | Ohanian et al. ............. 370/465 |
| 6,157,689 A | * 12/2000 | Petty et al. .................. 375/370 |
| 6,163,586 A | * 12/2000 | Hongbin Hao et al. ..... 375/377 |
| 6,263,016 B1 | * 7/2001 | Bellenger et al. ........... 375/222 |
| 6,307,642 B1 | * 10/2001 | Watanabe et al. .......... 358/1.15 |
| 6,374,375 B1 | * 4/2002 | Yip et al. .................... 714/715 |
| 6,452,963 B1 | * 9/2002 | Lee ............................. 375/222 |
| 6,535,485 B1 | * 3/2003 | Story .......................... 370/231 |
| 6,560,197 B1 | * 5/2003 | Levieux et al. ............. 370/231 |

* cited by examiner

Primary Examiner—Douglas Olms
Assistant Examiner—Van Nguyen
(74) Attorney, Agent, or Firm—Allen, Dyer, Doppelt, Milbrath & Gilchrist, P.A.

(57) ABSTRACT

An automated data rate detection mechanism examines bit contents of a data frame to identify the number of idle bytes (0111 1110). When no data is transmitted, an all '1's bit pattern (1111 1111) occupies other time slots unused by the customer's device. The number of subscribed DS0 (64 kbps) increments is determined by looking for the first idle byte following all '1's bytes, and counting the number of zero bits until further unused (all '1's) DS0s are encountered. Dividing the total number of zeros counted by two represents the number 'n' of assigned DS0 increments. Multiplying this number 'n' by the bit rate per DS0 channel (64 kbps) yields the bit rate.

15 Claims, 2 Drawing Sheets

US 6,687,232 B1

SUBSCRIBER LOOP TERMINAL EQUIPMENT-RESIDENT MECHANISM FOR DETERMINING BIT RATE OF HIGH-LEVEL DATA LINK CONTROL COMMUNICATION CHANNEL

FIELD OF THE INVENTION

The present invention relates in general to communication systems, and is particularly directed to a digital communication link pre-establishment control mechanism, that is incorporated into the communication control software employed by the microcontroller of customer premises-installed digital subscriber loop (DSL) terminal equipment, and which is operative to automatically determine the bit rate of high-level data link control (HDLC) digital communication service to which the customer has subscribed.

BACKGROUND OF THE INVENTION

Digital subscriber loop (DSL)-based communications, such as integrated services digital network (ISDN) services, enable telecommunication service providers to supply multiple types of digital signalling channels from a central office to a network termination interface or DSL terminal equipment, such as, but not limited to an ISDN phone, an X.25 packet device, or an ISDN terminal adapter, to which customer premises-resident data terminal equipment may be coupled.

Since the DSL terminal equipment is customer-purchased and installed, the telephone service provider does not participate in the customer's choice of the device that is connected to the DSL line. However, in order for a customer to be able to connect and conduct digital data communications through an installed piece of DSL terminal equipment, it is necessary that the DSL terminal equipment's supervisory communications controller be properly initialized or preconfigured with a prescribed set of DSL communication parameters as defined by the service provider. One of these parameters is the data rate which, in the case of T1 network as a non-limiting example, will be based upon the number of DS0 channels (up to twenty-four 64 kbps channels per T1 link) to which the customer has subscribed.

Now although this and other parameter information of the subscription service are provided by the telephone service provider to the purchaser of the terminal equipment, the user is usually technically unsophisticated and accustomed to doing nothing more than simply performing a 'plug-and-play' exercise. Experience has revealed that a very large majority of DSL customers will burden the equipment supplier and/or the local telephone service provider with requests for technical support in the course of configuring the settings for CPE terminal equipment, irrespective of whether the service provider has correctly supplied each of the parameters of the customer's terminal equipment.

SUMMARY OF THE INVENTION

In accordance with the present invention, the user's (actual or perceived) inability to properly configure an installed piece of DSL terminal equipment, in particular, setting the proper DSL bit rate, even when provided with correctly assigned operational parameters by the telephone service provider, is successfully remedied by an automated data rate detection mechanism, resident in the control software employed by the microcontroller of customer premises-installed DSL terminal equipment. As will be described, this automated data rate detection mechanism is operative to monitor the bit contents of digital signals conveyed over the DSL link to which the customer's equipment is connected and, based upon an analysis of those bit contents, automatically determines and sets the bit rate of the customer's equipment to conform with that of the (HDLC) digital communication service being supplied by the service provider.

For this purpose, during idle mode, the bit contents of a T1 frame of bits sourced from the network DSL device at the central office are examined to identify the number of idle bytes within the frame. Detection of idle bytes is based upon the fact that industry standard HDLC signaling practice is to transmit prescribed 'idle' codes (0111 1110) during the time slots used by a respective CPE DSL device when no data is being transmitted, and an all '1's bit pattern (1111 1111) in each of the other time slots that is unused by that device. Since each idle byte contains two and only two zeros, while all unused DS0 time slots contain only ones, the number of subscribed DS0 increments and therefore the number of 64 kbps sub-bandwidth increments may be readily determined by looking for the first occurrence of an idle byte following one or more all '1's bytes, and then counting the number of zero bits until further unused (all '1's-containing) DS0 channels are encountered. Dividing the total number of zeros counted by the value of two will necessarily represent the number 'n' of assigned DS0 increments. Multiplying this number 'n' by the bit rate per DS0 channel (64 kbps) yields the bit rate needed for error-free data transfer between the DSL network device and the CPE installed DSL equipment.

Because the bit rate detection mechanism of the invention does not depend upon particular skill or knowledge of the user, it is especially useful to accommodate a change in the subscribed-to bit rate. For example, if the customer subscribes to an increased (DS0) channel capacity, as a non-limiting example, the invention will enable the customer premises equipment to automatically reconfigure itself for the new rate. Once the new (e.g., higher) rate has been assigned by the customer service provider, running an initialization routine containing the bit rate determination mechanism of the invention will result in the customer's DSL device detecting the additional one or more DS0 channels, and adapting itself to the new bit rate.

DETAILED DESCRIPTION

Figure 1:
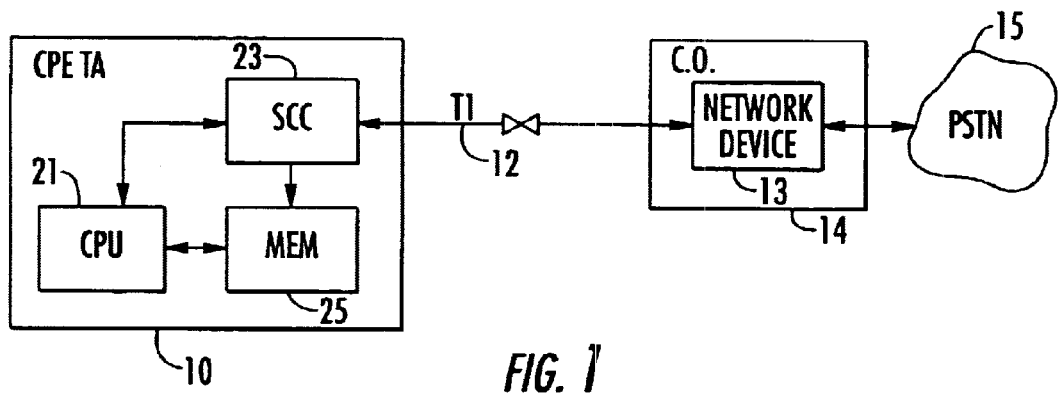
FIG. 1 diagrammatically illustrates a reduced complexity example of a digital telecommunication network, having a digital T1 link coupled from a telco central office to customer premises equipment containing the present invention.

Before describing in detail the new and improved bit rate detector mechanism in accordance with the present invention, it should be observed that the invention resides primarily in what is effectively a prescribed DSL communication link pre-establishment control mechanism, that is embedded in the communications control software resident in customer premises DSL communication equipment, such as but not limited to the control processor associated with the serial communications controller of HDSL terminal equipment. Consequently, the invention has been illustrated in the drawings in readily understandable block diagram and associated flow chart/state diagram format, which show only those specific details that are pertinent to the present invention, so as not to obscure the disclosure with details which will be readily apparent to those skilled in the art having the benefit of the description herein. Thus, the block diagram and flow chart illustrations are primarily intended to illustrate the major components of the communication control mechanism of the invention in a convenient functional grouping, whereby the present invention may be more readily understood.

In addition, for a non-limiting illustration of literature relating to digital communication message structures, procedures and protocols therefor, attention may be directed to the following: "Information Technology—Telecommunication and Information Exchange between Systems—High-level data link control (HDLC) procedures—Frame structure," International Organization For Standardization, ISO/IEC 3309:1991 (E), Fourth edition, 1991-06-01; "Information Technology—Telecommunication and Information Exchange between Systems—High-level data link control (HDLC) procedures—Frame structure," "Amendment 2: Extended transparency options for start/stop transmission," International Organization For Standardization, ISO/IEC 3309: 1991/Amd.2: 1992(E), 1992-01-15; and "Information Technology—Telecommunication and Information Exchange between Systems—High-level data link control (HDLC) procedures—Elements of procedures", International Organization For Standardization, Fourth edition, ISO/IEC 4335: 1991(E), 1991-09-15.

FIG. 1 diagrammatically illustrates a reduced complexity example of customer premises installed DSL communication equipment, such as high bit rate digital subscriber loop (HDSL) terminal equipment 10, that is coupled by way of a digital communication link 12, such as a T1 digital link, to a DSL network device 13 installed within the central office 14 of a telephone service provider, through which access to a public switched telephone network (PSTN) 15 is provided. As a non-limiting example, the (HDSL) terminal equipment 10 may comprise Express L1.5 terminal equipment, manufactured by Adtran Corp., Huntsville, Ala. It should be observed, however, that the present invention is not limited to use with this or any other particular piece of DSL terminal equipment, but is intended as an augmentation to the communication supervisory control mechanisms employed in terminal equipments, such as ISDN terminal adapters, available from a variety of DSL equipment manufacturers.

As mentioned above, various configuration parameters required for successful terminal equipment operation, including the bit rate associated with the number of DS0 channels of the customer's subscription, are usually supplied by the telephone service provider. Being technically unsophisticated, however, the customer may have difficulty in setting up this and other configuration parameters, and can be expected to call the equipment supplier and/or the local telephone service provider, with a request for assistance as to how to configure the bit rate setting of the terminal equipment.

The invention successfully obviates this problem by augmenting the communications control software employed by the terminal equipment's supervisory control processor 21, which controls the operation of a transceiver, shown as a serial communications controller (SCC) 23, to which the DSL link 12 from the central office is coupled. The automated bit rate detection mechanism, to be described in detail below with reference to the flow chart, state diagram of FIG. 4, monitors the bit contents of digital signals being conveyed over the DSL link 12 from the central office during the idle state or mode of the customer's equipment. As the bits are received, they are coupled from the SCC 23 into attendant memory 25 for examination by the bit rate determination mechanism of the invention. Based upon an analysis of the bit contents of the digital signals, including idle mode bytes, generated by the central office, the invention automatically identifies the bit rate of the customer's equipment. It then sets the bit rate of the serial communication controller at the detected bit rate, so as to conform with that of the (HDLC) digital communication service being supplied by the service provider.

Figure 2:
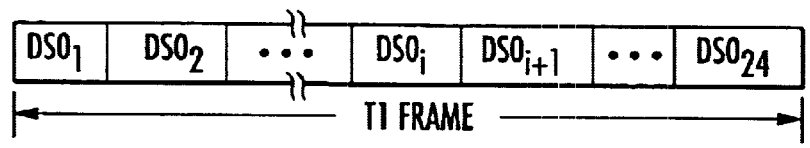
FIG. 2 shows a non-limiting example of customer subscription of two DS0 (64 kbps) channels corresponding to 128 kbps of bandwidth out of the available 1.536 Mbps of bandwidth of a complete 24 DS0 channel T1 data frame.

For purposes of providing a non-limiting example, the present invention will be described for the case where the customer has subscribed to 128 kbps of bandwidth (i.e., two DS0 (64 kbps) channels) out of the available 1.536 Mbps of bandwidth of a complete (24 channels) T1 data frame. As shown in FIG. 2, these two increments (DS0 channels) of the available bandwidth are assigned to the customer as two contiguous DS0 time slots $DS0_i$ and $DS0_{i+1}$ of the 24 DS0 time slots $DS0_1$–$DS0_{24}$. In accordance with industry standard HDLC signaling format, during time slots when no data is being transmitted, the HDLC layer being conveyed from the network device at the central office will assert prescribed 'idle' codes or bytes in the time slot or time slots used by a respective CPE DSL device, and an all '1's bit pattern in each of the other time slots that is unused by that device.

Figure 3:
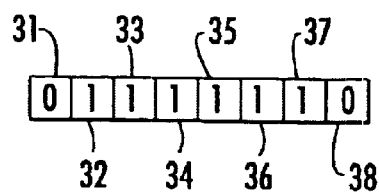
FIG. 3 shows the contents of an idle code/byte.

More particularly, as shown in FIG. 3, in accordance with telecommunication industry standards, a respective idle code/byte is comprised of a leading '0' bit 31, followed by a sequence of six '1' bits 32–37, and terminating with a '0' bit 38. This means that, for the present example shown in FIG. 2, the two contiguous DS0 time slots $DS0_i$ and $DS0_{i+1}$ will contain the bit pattern '0111 1110 0111 1110'. This bit pattern may be appear shifted in any order within the two DS0's. Since the network DSL is using only a portion of the total available bandwidth to the subscriber of interest, each of the remaining twenty-two time slots of the T1 frame, being unused by the subscriber, will contain the all '1's bit pattern '1111 1111'.

As pointed out earlier, the bit rate determination routine of the invention monitors the bit contents of the T1 frame to identify the number of idle bytes. Since, as shown in FIG. 3, each idle byte contains two and only two zeros (bits 31 and 38), while all of the remaining DS0 time slots contain only ones, the number of subscribed DS0 increments and therefore the number of 64 kbps sub-bandwidth increments may be readily determined by looking for the first occurrence of an idle byte and then counting the number of zero bits until further unused (all one's-containing) DS0 channels are encountered. Idle bytes may not necessarily align with the byte boundaries of the DS0's. However, this does not affect the calculation. Dividing the total number of zeros counted by the value of two will necessarily represent the number 'n' of assigned DS0 increments. Multiplying this number 'n' by the bit rate per DS0 channel (64 kbps) yields the bit rate needed for error-free data transfer between the DSL network device and the CPE installed DSL equipment.

Figure 4:
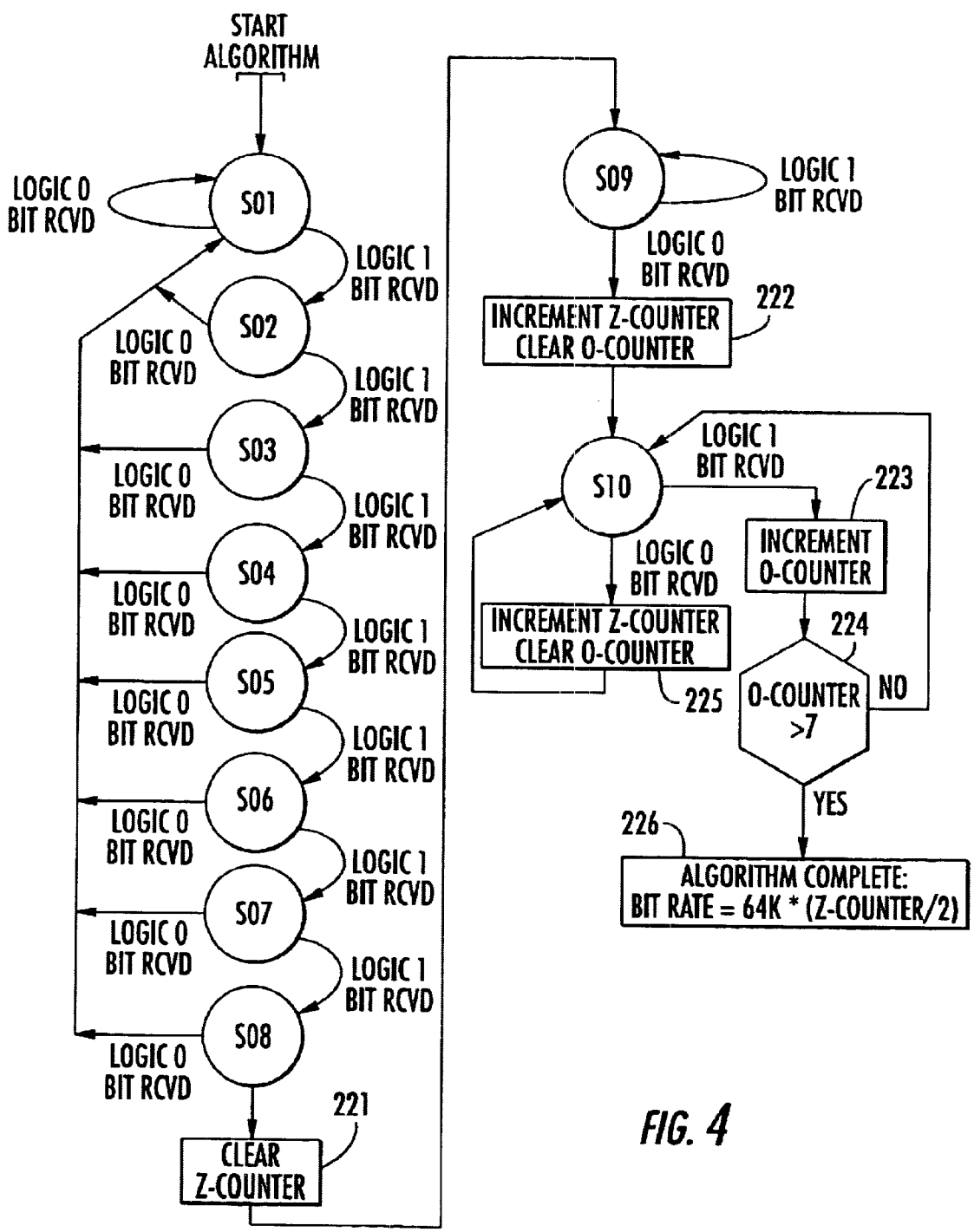
FIG. 4 is flow chart, state diagram of a non-limiting, but preferred embodiment of the automated bit rate determination mechanism of the present invention.

The respective steps of the automated bit rate detection mechanism of the present invention will now be described with reference to the flow chart, state diagram of FIG. 4. As shown therein, at an initial state S01, as a precursor to looking for one or more idle bytes, the terminal equipment's microcontroller monitors the bits being conveyed over the T1 link from the central office for one or more DS0 channels of the T1 frame that are unused by the customer's terminal equipment. As noted above, since any unused DS0 slot will contain an all '1's bit code (only '1' bits), the initial state S01 looks for a '1' bit. Until a '1' bit is detected in the monitored HDLC frame, the routine stays in state S01.

In response to a '1' bit being detected in state S01, the routine transitions from state S01 to state S02. As additional '1' bits are successively detected, the routine proceeds to increment through states S03–S08 to step 221. However, if during any of the states S02–S08, a '0' bit is received, the routine loops back to state S01. In effect, the sequence of states S01–S08 serves to look for eight consecutive '1' bits—namely, the bit pattern of an unused DS0 channel. Once it detects a unused DS0 channel, the routine transitions to step S09, wherein it begins looking for one or more idle code bytes, associated with DS0 time slots that may be assigned to the DSL terminal device.

For this purpose, the routine transitions from state S08 to step 221, wherein the contents of a zero (Z)-counter are cleared. The Z-counter is used to count zero bits within one or more of the idle code bytes of FIG. 3. As long as '1' bits are being detected, indicating the receipt of additional all '1's bytes associated with further unused DS0 channels, the routine remains in state S09. Eventually, however, for the present example, the frame transmitted from the network DSL device will contain the idle byte pattern '0111 1110' associated with the first DS0 time slot assigned to the subscriber—time slot $DS0_i$. In response to receipt of the first bit '0' of this idle byte pattern, the routine transitions to step 222, wherein the contents of the Z-counter are incremented by one, and the contents of a 'Ones' (O) counter are cleared.

In state S10, the logic level of the next received bit is examined to determine whether it is a '1' or a '0'. If the bit is a '1' (the expected value of the second bit of the idle pattern '0111 1110' associated with DS0 time slot $DS0_i$), the O-counter is incremented by one in step 223, and the routine transitions to query step 224. In query step 224, a determination is made as to whether the contents of the O-counter has exceeded a value of seven. If the answer to query step 224 is NO, which is the case for the first '1' bit following the leading '0' bit of the idle byte, the routine transitions to state S10. For the case of an idle byte, the next five bits (bits three through seven) will be '1's, causing the contents of the O-counter to be sequentially incremented in step 223 to a count value of six. When the eighth bit of the idle byte ('0') is received, the routine transitions from state S10 to step 225. In step 225, the Z-counter, which currently has a value of one, is incremented to a value of two; in addition, the O-counter is cleared, and the routine returns to state S10.

For the current subscription example of two contiguous DS0 channels, the next byte in the frame from the network DSL device will also contain the idle byte pattern '0111 1110'—associated with DS0 time slot $DS0_{i+1}$. In response to receipt of the first bit '0' of this next idle byte pattern, the routine transitions from state S10 to step 222, wherein the contents of the Z-counter are incremented by one (to a value of three), the contents of a 'Ones' (O) counter are cleared, and the routine returns to state S10.

Again, in state S10, the logic level of the next bit is examined to determine whether it is a '1' or a '0'. Since the bit is a '1' (the expected value of the second bit of the next successive idle pattern '0111 1110' associated with time slot $DS0_{i+1}$), the O-counter is incremented by one in step 223, and the routine transitions to query step 224. In query step 224, a determination is made as to whether the contents of the O-counter has exceeded a value of seven. Since the O-counter is currently cleared, the answer to query step 224 is NO, and the routine transitions back to state S10.

For the case of the second idle byte, the next six received bits (bits two through seven) will be '1's, causing the contents of the O-counter to be sequentially incremented in step 223 to a count value of six. As the eighth bit of the second idle byte is a '0', the routine will transition from state S10 to step 225. In step 225, the Z-counter, which currently has a value of three, is incremented to a value of four; in addition, the O-counter is cleared, and the routine returns to state S10.

In the present example of two contiguous DS0 channels assigned to the CPE DSL terminal device, the next twenty-two bytes in the T1 frame from the network DSL device will be contain the unused byte pattern '1111 1111'. In response to receipt of the first bit '1' of this unused byte pattern, the routine transitions from state S10 to step 223, wherein the contents of the O-counter are incremented by one (from zero to a value of one, and the routine transitions to query step 224, wherein a determination is made as to whether the contents of the O-counter has exceeded a value of seven. If the answer to query step 224 is NO, which is the case for the first '1' bit of the unused byte of interest, the routine transitions to state S10.

At the second bit '1' of the unused byte pattern, the routine again transitions from state S10 to step 223, wherein the contents of the O-counter are incremented by one (from a value of one to a value of two one, and the routine transitions to query step 224, wherein a determination is made as to whether the contents of the O-counter has exceeded a value of seven. Again, the answer to query step 224 is NO, and the routine transitions back to state S10. This loop is continued for the next five bits (the third through seventh '1' bits) of the unused DS0 channel (all '1's) pattern, as the O-counter is incremented up to a value of seven.

When the last or eighth bit of the first (all '1's) unused byte pattern following the idle byte associated with time slot $DS)_{i+1}$ is received, step 223 increments the O-counter to a value of eight. As a consequence, the answer to query step 224 is YES, and the routine transitions to step 226. In step 226, the contents of the Z-counter (currently at a value of four) are divided by two, and the result is multiplied by the bit rate increment per DS0 channel (64 kbps in the present example of a twenty-four channel T1 frame), yielding the correct bit rate of 128 kbps associated with a subscription of two DS0 channels.

As will be appreciated from the foregoing description, a DSL subscriber's potential inability to properly set the DSL bit rate, even though correctly supplied by the telephone service provider, is successfully remedied by the automated data rate detection mechanism of the invention, that is incorporated into in the communication control software employed by the microcontroller of customer premises-installed DSL terminal equipment. By examining the bit contents of an idle mode T1 frame, and detecting the number of idle bytes, the invention is able to automatically determine and set the bit rate of the customer's equipment to conform with that of the (HDLC) digital communication service being supplied by the service provider.

Because the invention is deterministic, it is able to rapidly converge (within a single T1 frame) to the correct bit rate necessary for error-free data transfer via the (HDLC) digital communication service supplied by the service provider. In contrast, conventional data rate selection techniques, which typically involve trial and error approaches, are considerably slower as they iteratively attempt to communicate with a host using different bit rates until the proper rate is found. As noted above, this is particularly useful where the customer subscribes to a new bit rate, as the CPE device will be automatically reconfigured at the new rate. Once the new rate has been assigned by the customer service provider, running an initialization routine containing the bit rate determination mechanism of the invention will result in the customer's DSL device detecting the additional one or more DS0 channels, and adapting itself to the new bit rate.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed is:

1. A method for automatically enabling a digital communication device to conduct digital communications over a telecommunication link with a network device at a bit rate established by said network device, said method comprising the steps of:
   (a) monitoring digital communication signals conveyed over said telecommunication link from said network device to identify the presence of at least one prescribed digital code therein; and
   (b) determining said bit rate in accordance with contents of said least one prescribed digital code identified in step (a), wherein
      said telecommunication link comprises a T1 digital communication link, and said network device is operative, during idle mode, to transmit an idle byte over said T1 digital communication link during each DS0 time slot of a T1 frame used by said digital communications device, and an all '1's bit pattern in every other time slot of said T1 frame unused by said digital communication device, and wherein step (a) comprises monitoring said telecommunication link from said network device to identify said all '1's bit pattern as a precursor to detecting said at least one prescribed digital code.

2. A method according to claim 1, wherein step (a) comprises monitoring digital communication signals conveyed over said telecommunication link from said network device to identify the number of idle bytes within a frame of digital communication signals, and step (b) comprises determining said bit rate in accordance with the number of occurrences of a prescribed bit within the number of idle bytes contained in said frame of digital communication signals.

3. A method according to claim 2, wherein said idle byte comprises the digital bit sequence 0111 1110, and said prescribed bit is a 0 bit.

4. A method according to claim 1, wherein said idle byte comprises the digital bit sequence 0111 1110, and wherein step (b) comprises determining said bit rate in accordance with the number of occurrences of a 0 bit within the number of idle bytes contained in said T1 frame.

5. A method according to claim 4, further including the step (c) of configuring a serial communications transceiver of said digital communication device to conduct digital data communications within one or more DS0 time slots of said T1 frame using said bit rate determined in step (b).

6. A method for automatically changing the bit rate employed by a customer premises site installable digital communication device, that is configured to conduct digital communications over a telecommunication link with a network device at a first bit rate, and thereby enable said digital communication device to conduct digital communications at a second bit rate, different from said first bit rate, said method comprising the steps of:
   (a) monitoring digital communication signals conveyed over said telecommunication link from said network device to identify the presence of at least one prescribed digital code therein;
   (b) determining said second bit rate in accordance with contents of said least one prescribed digital code identified in step (a); and
   (c) changing the bit rate, employed by said digital communication device to conduct digital communications over said telecommunication link with said network device, from said first bit rate to said second bit rate determined in step (b); and wherein
      said telecommunication link comprises a T1 digital communication link, and said network device is operative, during idle mode, to transmit an idle byte over said T1 digital communication link during each DS0 time slot of a T1 frame used by said digital communications device, and an all '1's bit pattern in every other time slot of said T1 frame unused by said digital communication device, and wherein step (a) comprises monitoring said telecommunication link from said network device to identify said all '1's bit pattern as a precursor to detecting said at least one prescribed digital code.

7. A method according to claim 6, wherein step (a) comprises monitoring digital communication signals conveyed over said telecommunication link from said network device to identify the number of idle bytes within a frame of digital communication signals, and step (b) comprises determining said second bit rate in accordance with the number of occurrences of a prescribed bit within the number of idle bytes contained in said frame of digital communication signals.

8. A method according to claim 7, wherein said idle byte comprises the digital bit sequence 0111 1110, and said prescribed bit is a 0 bit.

9. A method according to claim 7, wherein said idle byte comprises the digital bit sequence 0111 1110, and wherein step (b) comprises determining said second bit rate in accordance with the number of occurrences of a 0 bit within the number of idle bytes contained in said T1 frame.

10. A method according to claim 9, wherein step (c) comprises configuring a serial communications transceiver of said digital communication device to conduct digital data communications within one or more DS0 time slots of said T1 frame using said second bit rate determined in step (b).

11. A digital communication device comprising:
   a digital communications transceiver that is configurable to conduct digital communications over a telecommunication link with a network device at a bit rate established by said network device; and
   a communications controller, coupled to said digital communications transceiver, and being operative to process digital communication signals conveyed over said telecommunication link from said network device and received by said digital communications transceiver, so as to identify the presence of at least one prescribed digital code therein, and to configure said digital communications transceiver to operate at a bit rate that is based upon contents of said least one prescribed digital code identified in said digital communication signals received by said transceiver, and wherein said telecommunication link comprises a T1 digital communication link, and said network device is operative, during idle mode, to transmit an idle byte over said T1 digital communication link during each DS0 time slot of a T1 frame used by said digital communications device, and an all '1's bit pattern in every other time slot of said T1 frame unused by said digital communication device, and wherein said communications controller is operative to examine said digital communication signals conveyed over said telecommunication link from said network device and received by said transceiver, to identify said all '1's bit pattern as a precursor to detecting said at least one prescribed digital code.

12. A digital communication device according to claim 11, wherein said communications controller is operative to examine said digital communication signals conveyed over said telecommunication link from said network device and received by said transceiver, so as to identify the number of idle bytes within a frame of digital communication signals, and to determine said bit rate in accordance with the number of occurrences of a prescribed bit within the number of idle bytes contained in said frame of digital communication signals.

13. A digital communication device according to claim 12, wherein said idle byte comprises the digital bit sequence 0111 1110, and said prescribed bit is a 0 bit.

14. A digital communication according to claim 11, wherein said idle byte comprises the digital bit sequence 0111 1110, and wherein said communications controller is operative to determine said bit rate in accordance with the number of occurrences of a 0 bit within the number of idle bytes contained in said T1 frame.

15. A digital communication according to claim 14, wherein said communications controller is operative to configure said transceiver to conduct digital data communications with said network device within one or more DS0 time slots of said T1 frame using said determined bit rate.

* * * * *

UNITED STATES PATENT AND TRADEMARK OFFICE
CERTIFICATE OF CORRECTION

PATENT NO. : 6,687,232 B1  Page 1 of 1
DATED : February 3, 2004
INVENTOR(S) : Kyle A. Farnsworth It is certified that error appears in the above-identified patent and that said Letters Patent is hereby corrected as shown below:

Title page, Item [54] and Column 1, lines 1-5,
Title, should read -- DIGITAL SUBSCRIBER LOOP TERMINAL EQUIPMENT-RESIDENT MECHANISM FOR DETERMINING BIT RATE OF HIGH-LEVEL DATA LINK CONTROL COMMUNICATION CHANNEL --

Column 2,
Line 56, delete "is flow" insert -- is a flow --

Column 3,
Line 2, delete "to the" insert -- to, the --

Column 4,
Line 40, delete "may be appear" insert -- may appear --

Column 6,
Line 18, delete "will be contain" insert -- will contain --
Line 22, delete "one," insert -- one), --
Line 31, delete "one," insert -- one), --
Line 41, delete "DS)$_{i+1}$" insert -- DS0)$_{i+1}$ --

Column 9,
Line 2, delete "said least" insert -- said at least --

Signed and Sealed this

Twenty-seventh Day of April, 2004

JON W. DUDAS
*Acting Director of the United States Patent and Trademark Office*